United States Patent Office 3,278,655
Patented Oct. 11, 1966

3,278,655
METHOD FOR SPHERING REFRACTORY OXIDES
Harold N. Barr, Baltimore, Md., assignor to Martin-Marietta Corporation, Baltimore, Md., a corporation of Maryland
No Drawing. Filed Oct. 13, 1961, Ser. No. 144,837
23 Claims. (Cl. 264—.5)

The present invention relates to processes for the treatment of refractory oxides and more particularly, the invention relates to the sphering of refractory oxides for use in fuel element manufacture.

The use of spherical particles of $UO_2$ and the like in lieu of conventional, irregularly shaped particles is most desirable in cermet fuel element manufacture for a variety of reasons. Use of a sphere form will minimize fracture of the particles during the manufacturing operations required in fabricating fuel elements, since a sphere form enjoys an inherent structural stability. It has been noted that sphere form fuel particles will be maintained as discrete particles within a matrix thereby minimizing the radiation damage area around them. A spherical particle will also present a minimum amount of surface area which, in turn, will minimize corrosion or reaction of fuel and matrix.

Procedures for sphering powderous refractory oxides have been advanced including that of forming spherical granules of the oxide powder upon a laterally vibrating surface. The procedure offers an undesirable lack of control of range of sphere diameters within each batch and requires a second step of densification of the spheres so formed, usually by sintering. The secondary sintering process has the effect of causing adjacent spheres to fuse together, distort and meld into each other, thereby destroying the spheral form.

Particles of refractory oxides have also been processed in a high temperature or plasma range spraying arrangement having temperatures sufficient to melt the refractory oxide, thereby leading to the formation of spheres. In the above instance, however, the spheres formed have either large, undesirable voids or are mere shells due to the vaporization and decomposition of the oxide. Spheres have also been formed by dropping a slurry of refractory oxide in water through a capillary tube, however, the sphere formations require densification usually by sintering as before described and the process suffers the same attendant disadvantages.

In the instant invention a method is presented in which spheres of a refractory oxide may be formed having a well defined spherular shape and, of greater importance, a density sufficient to substantially eliminate void or hollow shell configurations. The surfaces of the spheres of this method show a significantly uniform surface, having no pits or similar defects. The invention is particularly characterized in providing means to avail an easily obtained controlled range of sphere sizes, especially below 60 microns in diameter in which range other known methods are particularly ineffective.

These and other objects are accomplished by blending the refractory oxide with an essentially small portion of an additive effective to form a phase with the refractory oxide having a lower melting point than the refractory oxide; forming granules of the mixture of a desired size and flame spraying the granules with an oxygen-hydrocarbon gas into a cooling environment. The amount of additive blended with the refractory oxide is, contrary to a priori prediction, present in an amount between about 0.10 and 3.5 percent by weight. To aid in densification, the mixture may, in most cases, be sintered at a temperature which will prevent the additive from entering into solution with the refractory oxide.

In an embodiment using uranium dioxide as the refractory oxide, powderous uranium dioxide is blended with from $\frac{1}{10}$ to 3.5 percent by weight titanium dioxide. The resulting mixture is sintered in a protective atmosphere at 1250° C. to 1700° C. During this step a reaction is effected between components. The resulting sintered mixture is then crushed by conventional means and screened to provide granules of a size appropriate to evolve the anticipated sphere size. It has been found desirable to furnish granules at this step having passed a screening size slightly larger than the ultimately desired size of the spheres. Granules thusly formed are passed through an oxygen-hydrocarbon flame as commonly provided by an oxyacetylene flame spray apparatus. During this step it is reasoned that the uranium dioxide-titanium dioxide compound produced by the reaction of the additive at sintering aids to lower the melting temperature of the refractory oxide (uranium dioxide) sufficiently to melt and allow the assumption of a spheral form within the flame spray. To insure the integrity of the sphered granules, the flame spraying procedure may be carried out in a protective atmosphere although the success of the method is not dependent upon this. It is to be noted that the maximum theoretical flame temperature of oxyacetylene flame is about 3000° C. Heating of the granules passing through the flame is transitory, the granules not being heated to the maximum available temperature. Heat input to the granules is regulated by the time of transit within the flame and is below that required to melt the oxide alone. The spheres so formed gradually cool as they move through the fringe portion of the flame. Having passed through the flame, the granules, now in the form of spheres, are directed into a cooling environment which may simply be a receptacle for a coolant as water or gas. The receptacle may have any convenient form. In a final step of the process, the spheres may be screened to provide a desired and more uniform size distribution.

The particular percentage additions of the additives are preferably adjusted to the size of the sphere desired. In utilizing the additive as above described, it has been found necessary to provide an initial sintering process as described. In this particular case, by eliminating the sintering process before flame spraying, it is found that although spheres are formed, they exhibit a high degree of porosity or void defect.

In another embodiment providing for sphering of uranium dioxide, the additive may be a calcium oxide-titanium dioxide combination. Although a broad range of relative amounts of these constituents are found workable, the most productive blending of this additive has been found to be a one to four ratio of calcium oxide and titanium dioxide respectively. As above, powderous uranium dioxide is blended with from $\frac{1}{10}$ to 3.5 percent by weight of calcium oxide-titanium dioxide additive, the amount being dependent upon the sphere size desired. Following the blending of the two powders, they are dried and granulated to a preferred size. Granulation may be by any conventional means including that of compacting the powder mix followed by suitable grinding. The granules are then screened to a size slightly larger than the ultimate dimension of sphere desired following the flame spray step. Following granulation and screening, the rejected particles are returned to the original batch for re-processing and the acceptably sized granules are directed through an oxygen-hydrocarbon flame such as produced by a conventional oxyacetylene flame spray device. The spheres, formed during transportation through the flame, are progressively cooled as they leave the fringes of the flame and are then directed to a cooling environment such as a water bath. The flame spray process need not be conducted within a protective atmosphere. The resulting spherical particles may then be screened to provide a more reliable size distribution and are found to have a relatively high density and low porosity or void content.

A somewhat broad range of additives are found acceptable for either of the processes described above. In the latter process, calcium oxide-titanium dioxide, calcium oxide-titanium dioxide-calcium fluoride, silicon dioxide and niobium pentoxide have been found effective. The step of initial sintering of the powderous blend as aforedescribed may be provided when utilizing the calcium oxide-titanium dioxide and calcium oxide-titanium dioxide-calcium fluoride additives; however, it must be controlled to that temperature which will prevent the additive from entering into solution with the refractory oxide.

The effects of the additives may be summarized as follows:

(a) Additives which are completely soluble in the refractory oxide can only be effective in acceptable sphere formation in an unreacted form. These additives include $Nb_2O_5$, $CaF_2$, and $P_2O_5$ and form a small amount of a phase with the oxide in solution having a relatively low melting point with respect to the oxide itself.

(b) Additives including $CaO-TiO_2$, $CaO-TiO_2-CaF_2$, $SiO_2$ and $P_2O_5-Al_2O_3-SiO_2$ may be pre-sintered with the refractory oxide if the sintering temperature is minimized so that temperature which will not allow the additive to go into solution with the refractory oxide or if they are restricted from being completely reacted. These additives react with the oxide to form primarily a compound phase having a low melting temperature relative to the oxide.

(c) $TiO_2$, when used as an additive must be pre-sintered with the refractory oxide prior to flame spraying in order to form a lower melting point phase therewith which is primarily a compound phase.

The following tabulation is illustrative of the preferred percentage addition of additive for obtaining a desired dimension range of spheres.

*Table 1*

| Additive | Respective Constituents, Percent by Weight | Percent Addition | Optimum range of sphere diameter (microns) |
|---|---|---|---|
| $CaO-TiO_2$ | 18—82 | 0.10-0.50 | <40 |
| $CaO-TiO_2$ | 18—82 | 0.40-0.75 | 40-50 |
| $CaO-TiO_2-CaF_2$ | 16—70—14 | 1.50-2.0 | 60-105 |
| $CaO-TiO_2-CaF_2$ | 16—70—14 | 2.5-3.5 | 100-150 |

EXAMPLE

A batch consisting of 298.50 grams of uranium dioxide powder, 0.27 gram calcium oxide powder and 1.23 grams titanium dioxide powder was weighed and placed in a stainless steel ball-mill with 500 grams of ⅜ inch to ½ inch diameter ball. 150 cc. of distilled water was added to the mix and the batch was ball-milled for four hours.

Following the mill-blending, the contents of the mill were emptied on a coarse stainless steel screen and ½ percent by weight of polyvinyl alcohol was hand-blended with the resulting filtered cake. The cake was dried in an oven. The batch was then compacted by placing 90 grams of the dry powder blend in a 15/16" diameter die and pressed at 30 tons per square inch. The pellets were then cracked in a tool steel mortar and pestle to one-quarter inch lumps. The one-quarter inch lumps were then screened with a layer of stainless steel balls on a 100 mesh screen and on a 170 mesh screen. The material remaining on the 100 mesh or 170 mesh screen was then removed. The granulated uranium dioxide blend was then placed in the hopper of an oxyacetylene spray gun and flame sprayed. The flame was directed into a 3 inch water cooled pipe. The resulting spheres were screened to recover −270 and +325 mesh spheres.

The resulting spheres were found to be substantially free of surface defects such as pits and the like. The spheres were mounted and polished to provide a cross-sectional inspection. No deleterious voids were observed. The spheres were uniformly dense.

The foregoing detailed description of the instant invention is capable of extensive variation obvious to those skilled in the art and the scope of the invention is to be limited by the scope of the appended claims.

What is claimed is:

1. The method of forming spheres of a refractory oxide comprising the following steps:
    (a) mixing said oxide with an essentially small portion of an additive effective to form a phase with said oxide when heated in passing through an oxy-hydrocarbon flame having a lower melting point than said oxide,
    (b) forming said oxide and additive mixture into granules of a certain size,
    (c) passing said granules through an oxy-hydrocarbon flame having sufficient heat intensity to melt said phase,
    (d) and directing said granules to a cooling environment.

2. The method of claim 1 wherein said additive is present in an amount between about 0.10 and 3.5 percent by weight.

3. The method of claim 1 in which said oxide is uranium dioxide.

4. The method of claim 1 in which said additive is selected from the group consisting of, calcium fluoride, calcium oxide-titanium dioxide, calcium fluoride-calcium oxide-titanium dioxide, niobium pentoxide, vanadium oxide and silicon dioxide.

5. The method of claim 1 wherein said phase has a melting temperature of from approximately 1,000°–2,000° C.

6. The method of forming spheres from a powderous refractory oxide comprising the following steps:
    (a) mixing said refractory oxide with an essentially small portion of an additive effective to form a phase with said refractory oxide when heated in passing through an oxy-hydrocarbon flame having a lower melting point than said refractory oxide,
    (b) forming granules of a certain size from said mixture,
    (c) passing said granules through an oxy-hydrocarbon flame so as to heat said granules to a temperature below the melting point of the refractory oxide and above that of the phase,
    (d) and directing said heated granules to a cooling environment.

7. The method of claim 6 in which said additive is present in an amount between about 0.10 and 3.5 percent by weight.

8. The method of claim 6 in which said additive is selected from the group consisting of calcium fluoride, calcium oxide-titanium dioxide, calcium fluoride-calcium oxide-titanium dioxide, niobium oxide, vanadium oxide and silicon dioxide.

9. The method of claim 6 in which said refractory oxide is uranium dioxide.

10. The method of forming spheres from a powderous uranium dioxide comprising the folowing steps:
    (a) mixing said powerous uranim dioxide with titanium dioxide,
    (b) sintering the mixture to effect a reaction between said titanum dioxide and uranium dioxide,
    (c) crushing the mixture to form granules of a certain size,
    (d) spraying said granules through an oxyacetylene flame sufficient to melt at least a portion of said mixture thereby to sphere said granules, (e) and directing said flame sprayed granules to a cooling environment.

11. The method of claim 10 in which said mixing is performed by wet blending with a binding agent and then drying said blended mixture.

12. The method of claim 10 in which said mixture is sintered under a protective atmosphere at a temperature between 1250° C. and 1700° C.

13. The method of claim 10 including the step of screening said granules after crushing thereby to provide a substantial uniformity of sphere dimension.

14. The method of forming spheres from powderous uranium dioxide comprising the following steps:
   (a) mixing said powderous uranium dioxide with an additive selected from the group consisting of calcium fluoride, calcium oxide-titanium dioxide, calcium fluoride-calcium oxide-titanium dioxide, niobium oxide, vanadium oxide and silicon dioxide,
   (b) forming granules of a certain size from said mixture,
   (c) spraying said granules through an oxyacetylene flame sufficient to melt at least a portion of said mixture thereby to sphere said granules,
   (d) and directing flame sprayed granules through a cooling environment.

15. The method of claim 14 in which said granules have a size of less than 40 microns, said additive is calcium oxide-titanium dioxide and is present in an amount of about 0.1 to 0.5 weight percent.

16. The method of claim 14 in which said granules have a size between about 40 and 50 microns, said additive is calcium oxide-titanium dioxide and is present in an amount between about 0.4 and 0.75 weight percent.

17. The method of claim 14 in which said granules have a size between about 60 and 105 microns, said additive is calcium oxide-titanium dioxide-calcium fluoride and is present in an amount between about 1.5 and 2.0 weight percent.

18. The method of claim 14 in which said granules have a size between about 100 and 150 microns, said additive is calcium oxide-titanium dioxide-calcium fluoride and is present in an amount of about 2.5 to 3.5 weight percent.

19. The method of claim 1 wherein said additive is selected from the group consisting of calcium oxide-titanium oxide, calcium fluoride-calcium oxide-titanium dioxide, silicon dioxide, and phosphorous oxide-aluminum oxide-silicon dioxide and including the additional step of sintering said mixture at a temperature lower than that which would cause said phase from going into solution with said oxide prior to the step of forming said oxide and additive mixture into granules of a certain size.

20. The method of forming spheres of a refractory oxide comprising the following steps:
   (a) Mixing said oxide with an essentially small portion of an additive, said additive being effective to react with said oxide upon sintering to form a phase having a melting temperature lower than said oxide;
   (b) Sintering said oxide and additive mixture;
   (c) Forming said sintered mixture into granules of a certain size;
   (d) Passing said granules through an oxyacetylene flame of sufficient temperature to melt said phase; and
   (e) Directing said heated granules to a cooling environment.

21. The method of claim 20 wherein said additive is titanium dioxide.

22. The method of forming spheres of a refractory oxide comprising the following steps:
   (a) Forming a mixture of granules of a certain size of said oxide and an essentially small portion of a phase containing said oxide, said phase having a lower melting temperature than said oxide;
   (b) Heating said granules above the melting temperature of said phase and below the melting temperature of said oxide; and
   (c) Directing said heated granules to a cooling environment.

23. The method of claim 22 wherein said oxide is uranium dioxide.

References Cited by the Examiner

UNITED STATES PATENTS

| | | | |
|---|---|---|---|
| 2,794,301 | 6/1957 | Law et al. | 49—84 |
| 2,850,845 | 9/1958 | Kelly | 49—84 |
| 3,002,808 | 10/1961 | Mont | 25—14.5 |
| 3,070,420 | 12/1962 | White et al. | 176—90 X |

OTHER REFERENCES

AEC Document BMI-1009, October 1959.
AEC Document BMI-1117, October 1957.
AEC Document ORNL 1633, December 1953, p. 1 relied upon.
AEC Document ORNL 2011, December 1959, p. 22 relied upon.
AEC Document WAPD-PWR-PMM-491, September 1956, pp. 9 and 10 relied upon.
1st U.N. Conference on "Peaceful Uses of Atomic Energy" at Geneva, August 1955, vol. 9, pp. 170–172 relied upon.
2nd U.N. Conference on "Peaceful Uses of Atomic Energy" at Geneva, September 1958, vol. 6, pp. 593 and 597–600 relied upon.

L. DEWAYNE RUTLEDGE, *Primary Examiner*.

ROBERT L. CAMPBELL, REUBEN EPSTEIN, CARL D. QUARFORTH, *Examiners*.

R. W. MACDONALD, *Assistant Examiner*.